(12) United States Patent
Potts

(10) Patent No.: US 7,157,011 B1
(45) Date of Patent: Jan. 2, 2007

(54) VENT FOR LEACH FIELD AERATION

(76) Inventor: David A. Potts, 385 Roast Meat Hill Rd., Killingworth, CT (US) 06419

( * ) Notice: Subject to any disclaimer, the term of this patent is extended or adjusted under 35 U.S.C. 154(b) by 399 days.

(21) Appl. No.: 10/845,739

(22) Filed: May 13, 2004

Related U.S. Application Data (63) Continuation-in-part of application No. 10/830,263, filed on Apr. 21, 2004, now Pat. No. 6,887,383, which is a continuation of application No. 10/292,185, filed on Nov. 12, 2002, which is a continuation-in-part of application No. 09/526,381, filed on Mar. 16, 2000, now Pat. No. 6,485,647.

(60) Provisional application No. 60/125,070, filed on Mar. 17, 1999.

(51) Int. Cl.
*C02F 3/00* (2006.01)

(52) U.S. Cl. ............. 210/739; 210/741; 210/120; 210/220

(58) Field of Classification Search ........... 210/739, 210/741, 120, 220
See application file for complete search history.

(56) References Cited

U.S. PATENT DOCUMENTS 5,382,363 A  1/1995  Boylen ............ 210/605
5,827,010 A  10/1998  Hassett ........... 405/36

OTHER PUBLICATIONS

A. P. Bernhart "Treatment and Disposal of Wastewater From Homes By Soil Infiltration and Evapotranspiration", vol. 1, 2nd Ed., University of Toronto Press (1973); pp. 1-7, 22-31, 47-51 128-131, 158-159, 168-169.

P Warshall "Septic Tank Practices" Mesa Press (1976) pp. 1, 2, 42, 43.

*Primary Examiner*—Chester T. Barry
(74) *Attorney, Agent, or Firm*—Michael A. Blake; Charles G. Nessler (57) ABSTRACT

Pressurized air is flowed from a wastewater leach field conduit into and through the surrounding soil, and then to atmosphere above the soil surface, to enhance biochemical treatment of the wastewater. A vent, such as a perforated pipe or a region of porous media, buried within the soil in proximity to the leaching conduit, receives part of the air flowing from the conduit, and carries it directly to atmosphere, to shorten the path through the soil. A riser and with throttle valve enables control of the amount of air which flows through the vent. The vent may be directly above the conduit, to even out the air flow in soil along the length of the conduit, where the soil surface is uneven. A plurality of slot-like vent trenches are used when leach fields are beneath paved surfaces. In another embodiment, air is drawn through the soil and a vent to the conduit, which is maintained at sub-atmospheric pressure.

39 Claims, 7 Drawing Sheets

VENT FOR LEACH FIELD AERATION

This application is a continuation in part of patent application Ser. No. 10/830,263, filed Apr. 21, 2004, now U.S. Pat. No. 6,887,383 which is a continuation of application Ser. No. 10/292,185, filed Nov. 12, 2002, which is a continuation in part of patent application Ser. No. 09/526,381, filed Mar. 16, 2000, now U.S. Pat. No. 6,485,647. It claims benefit of provisional patent application No. 60/125,070, filed Mar. 17, 1999.

TECHNICAL FIELD

The present invention is related to subsurface systems for disposing of wastewater, particularly to the leach fields into which air is flowed.

BACKGROUND

A typical subsurface sewage system is comprised of a septic tank where primary treatment of wastewater takes place. The effluent wastewater is flowed to a leaching system apparatus, buried in the soil, for secondary treatment. One typical apparatus comprises serially connected leaching structure made of molded thermoplastic or concrete having perforated walls. Another apparatus comprises perforated pipes within stone filled trenches. Another comprises leaching pits, or vertical extending holes typically defined by circular cross section masonry having perforations, e.g., a precast structure or dry-laid concrete blocks. In still others, proprietary commercial devices are used, e.g., devices sold under the brand names Eljen In-Drain, Ruck A Fins, and Form Cell Living Filter. In another related type of apparatus, there is no septic tank. Raw wastewater flows into a cesspool, or covered pit, from which it leaches into the soil. In this application, any buried device that receives wastewater, to then percolate it into the surrounding soil where it is treated by microbiological action is referred to as a leaching conduit.

When wastewater flows into the soil adjacent the leaching conduits, it is naturally and microbiologically processed, to become more environmentally benign. Such adjacent soil is sometimes referred to as the influence zone. Treated waste water then typically flows from the influence zone downwardly through the soil to the underlying water table or to some other discharge point. In accord with U.S. Pat. No. 6,485,647 "Method and Apparatus for Treating Leach Fields" biochemical processing of wastewater is enhanced by flowing air or other active gas through the influence zone, preferably by flowing air under pressure into the leaching system conduit. Typically, the leaching conduit is pressurized and air flows from the conduit, through the soil, to atmosphere. In an alternate embodiment, auxiliary pipes in the soil run parallel to and spaced apart from horizontally running chambers. The auxiliary pipes are either evacuated or pressurized relative to the conduit interior, to induce flow to of from the conduit. The leaching field aeration technology can be applied to new installations, or retrofitted onto old installations. It may be used to increase capability for a system, or to rejuvenate and restore the capability of an old system.

Experience with leach field aeration installations shows that the characteristics of the soil overlying conduits may affect how air flows through the influence zone and thus diminish the potential effectiveness of the methodology. For instance, flow distribution in the soil can be affected if the soil layer is thicker or less permeable over one portion of the conduit, compared to another. Less air will flow through the influence zone associated with the more air flow-resistive overlying layer. Functional resistance to flow can be affected by such as soil constituents, water content, organic content, plant roots, and tunnels of small animals. The variations in soil resistance may be present along the length of a conduit, or from conduit row to conduit row within a system. It is often not feasible to make constant the thickness, structure, composition, and so forth, of soil overlying a leaching system, especially when the native terrain is uneven.

In some leaching system installations, the soil is topped by a bituminous pavement or analogous material which is vastly different from soil, and which pavement has either limited permeability or uneven permeability, due to changes thickness, density, cracks, and so forth.

Thus, the benefits of air flow into the leaching system can be uneven due to the nature of the overlying soil. This is especially apparent when the length of the system is long and the soil character is locally varied. Thus, there is a need to prevent or overcome such problems and obtain better distributed, or more uniform, air flow in aerated leaching systems, so the system as a whole air-enhanced biochemical processor performs near-optimally.

SUMMARY

An object of the invention is to improve aeration of the influence zone of a leach field, when air is flowed under pressure into a conduit, to enhance biochemical processes, or to restore the functionality of a degraded system. A further object is to control the way in which air flows in soil, when a conduit is pressurized with air, particularly when the depth or permeability of the soil above the conduit varies within a leaching system.

In accord with the invention, a leaching system for treating wastewater beneath the surface of soil is comprised of a leaching conduit, means for pressurizing the conduit with air (or another active gas) so pressurized air flows from the conduit, through a wastewater treatment influence zone adjacent the conduit, and then perhaps through other soil, and then to atmosphere. The vent is a region of artificially increased permeability, which receives a portion—typically a large fraction, of the air which flows through the soil. The vent may be formed by a perforated pipe; alternately it may be a region or layer of porous particulate or fibrous media; or it comprise spaced apart holes filled with porous media. The invention is used with predominantly horizontal and vertical running conduits. In a preferred embodiment, the vent is vertically spaced apart above a horizontal conduit by a nominally constant thickness layer of soil. Alternately, the vent is laterally offset.

The vent changes the flow of air within soil, compared to having no vent. In some embodiments, the vent simply makes easier the upward flow toward atmosphere. In other embodiments, the vent runs upwardly to the surface of the soil. In still other embodiments, the vent is connected to a riser which has a valve or other means for throttling the amount of air flowing out of the vent riser to atmosphere, so the distribution of air flow within the soil can be controlled by adjusting the throttle.

When the soil surface is uneven or the soil has uneven permeability, the height of the vent may vary, so that the resultant total upward flow resistance for air, at points along the length of the conduit, is substantially uniform in thickness. Thus, airflow through the influence zone along the length of a horizontal conduit will become more uniform. A vent may comprise a plurality of spaced apart vertical holes filled with porous media, such as particulate or fiber. When the soil has a hard, less permeable surface, such as bituminous pavement, vents comprised of a plurality of slot trenches running to the surface are preferred.

Particularly, with a substantially vertical leaching conduit, such as a leach pit or cesspool the air inlet portion of a vent pipe(s) is preferably below the invert of the pipe which delivers wastewater to the conduit interior. In another embodiment, the vent is donut shaped and circumscribes the sidewall or top of a vertical running conduit.

When the soil profile is stratified, a vent is preferably positioned a substantial distance laterally from the side of the conduit, so that air flow is induced to flow said distance through a more permeable stratum, and to enhance wastewater treatment within the stratum.

In most instances the chamber will be pressurized and the vent will be connected to atmosphere, with or without a valve. In a less common embodiment, the chamber will be at a sub-atmospheric pressure and air from the atmosphere will flow serially through the soil and vent toward the chamber. In such instance, the vent will be at a pressure which is less than that of atmosphere, in differing degree according to the particular embodiment.

The foregoing and other objects, features and advantages of the invention will become more apparent from the following description of preferred embodiments and accompanying drawings.

DESCRIPTION

The invention is described for particular applications, by examples. It may be used with leaching systems and conduits in general, especially those diverse kinds mentioned in the Background. Aerated leaching systems are described in U.S. Pat. No. 6,485,647 and application Ser. No. 10/292,185, the disclosures and drawings of which are hereby incorporated by reference.

Figure 1:
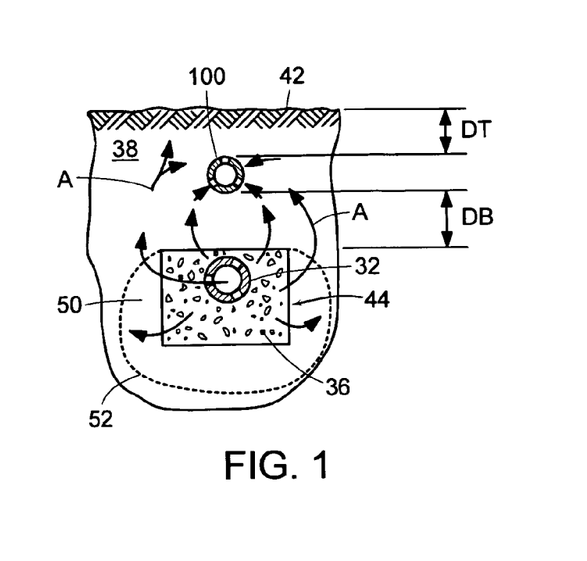
FIG. 1 is a vertical cross section through soil, transverse to the length of a leaching conduit like that shown in FIG. 2, wherein a vent line comprised of a perforated pipe in the soil runs above and parallel to the conduit.

FIG. 1 of U.S. Pat. No. 6,485,647 shows a typical subsurface sewage system comprised of a septic tank 20, wherein primary treatment of wastewater takes place. The effluent wastewater from the septic tank is flowed to a leaching system 40, buried in the soil. A typical horizontal leaching system apparatus comprises one or more rows of serially connected leaching chambers 34, fed from a distribution box 30. The chambers may be arch shaped in cross section and made of molded thermoplastic, alternately other materials. Leaching conduits may also comprise perforated pipes 32 running along stone filled trenches 35, as shown in the patent FIG. 1 and in the Figures herein. Not shown, leaching conduits may comprise pre-cast box-like structures, referred to variously as galleries or chambers.

The present invention is first described in terms of the stone filled trench type conduits, but is equally applicable any other structures within soil, which form leaching systems that run predominately horizontally. A claim to a conduit comprehends part or the whole of the length of a long conduit. The invention is then described in terms of leach pits, cesspools and other structures, which tend to be viewed as predominately running substantially vertically, in context of a horizontal running string of chambers or leaching trench or galleries—which is the same kind of distinction as is made between a trench and a pit in common excavation parlance.

A typical stone and pipe leaching trench and a typical molded plastic chamber will be about 2–3 feet wide and 12–18 inch high. The total length of trench or chamber system will depend on the rate at which water has to be percolated, the soil capacity to receive it, and the design rating of the conduit. Most chamber and stone and trench conduits run horizontally or very slightly downwardly, so wastewater distributes evenly by gravity. There may be step-downs from one set of conduits to another, as when the system is placed on sloping ground. The invention may also be applied to leaching pits and cesspools, which conceptually run vertically or comprise circular cross section spaces, as described herein.

In an embodiment of the present invention, the interior of a horizontal leaching conduit is pressurized by a blower, or other analogous device, which provides a pressure of up to 40 iwc (inch of water column) during operation. Typical operational pressures within the conduit are in the range of 5–60 iwc, and can run as high as 160 iwc. Typical air flow will be in the range of 0.03–0.15 standard cubic feet per minute per square foot of soil, where soil area is an approximation, typically calculated as the sidewall and base area of the conduit which area is below the level of the invert of the pipe which delivers waste to the leach system. In practice, there may be air flow to areas other than the above-defined water percolation area. While use of atmosphere air is described and will be most common, in the generality of the invention, any active gas may be used, which actively promotes the biological processes, whether oxidation or otherwise. See U.S. Pat. No. 6,485,647. Thus, the term air as used herein shall be understood to encompass the use other gases, especially including air which has oxygen added, for instance, in forms such as $O_2$, $O_3$, $H_2O_2$, or as part of some other familiar chemical composition.

Figure 2:
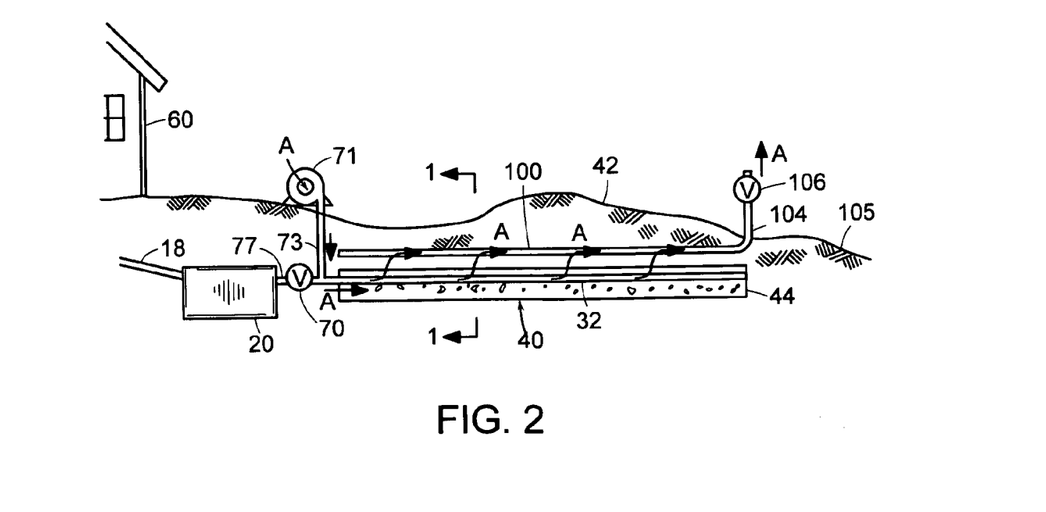
FIG. 2 is a cross section elevation view of a portion of a septic system comprising a septic tank and leach field, buried in undulating soil, showing a conduit and associated vent pipe which runs to a riser with valve.

FIG. 2 herein is a vertical cross section through the length of a leaching system in which the elevation of the soil surface 42 varies along the length of the one leaching conduit 44 which is shown. FIG. 1 shows a cross section transverse to the length of the conduit 44. In use, waste water flows from dwelling 60, through sewer line 18, to septic tank 20. The water then flows through check valve 70 and into perforated pipe 32 which is contained within a stone filled trench, the pipe and stone combination comprising leaching conduit 44. Blower 71 provides air or another active gas via feed pipeline 73 to waste water line 77 which running to conduit 44. Check valve 70 prevents flow other than into leaching conduit 44.

As described in U.S. Pat. No. 6,485,647, in the absence of any evacuated auxiliary pipes (See Background), pressurized air within the conduit flows through the influence zone in soil near the chamber, then through other soil to the soil surface 42 and atmosphere above. In the present invention, that usual airflow pattern is altered, so that at least a portion of the air leaving the conduit flows to a vent which is at or above atmospheric pressure. Arrows A indicate flow of air in the Figures.

With reference to the vertical cross section of FIG. 1 and to FIG. 2, leaching conduit 44 comprises a trench filled with stone 36 through which runs perforated pipe 32, buried in soil 38. Wastewater flows from pipe 32, through the stone, and into the influence zone 50. The outer bound 52 of influence zone 50 is indicated by a dashed line, to thereby communicate that it is schematic or conceptual. The limiting point at which biochemical treatment of the waste water may not be precisely definable, and the extent of the influence zone can vary with time, wastewater flow, BOD, etc.

It will be appreciated, by reference to U.S. Pat. No. 6,485,647, that an arch shape cross section molded chamber such as an Infiltrator® standard chamber (Infiltrator Systems, Inc., Old Saybrook, Conn., U.S.) or other commercial product may be substituted for the stone filled trench with perforated pipe which is discussed in connection with the Figures herein. Air flow from a leaching conduit which is a chamber will be generally similar to that shown for the stone filled trench, except that little air will flow directly vertically from the conduit. The arch top of typical chamber is solid plastic and impermeable except for the joints between end-to-end interconnected chambers. Typically, trenches and chambers are 2–3 feet in width and 1–1.5 feet in height.

In this example, vent 100 is a perforated pipe buried in the soil directly above the leaching conduit 44, to receive the air flowing through the soil 38. Vent 100 runs along part or all of the length of the leaching conduit. In the generality of the invention, a vent is a region within the soil which has artificially lower permeability (i.e., a constructed region, in distinction to a naturally occurring region) than the permeability of the nearby soil. The vent, or an air carrying riser connected thereto, may run to the surface. Or, as below, the vent may simply provide a easier flow path within the soil.

As shown in FIG. 2, preferably vent 100 runs to riser 106, and thus to atmosphere. Optionally, control valve 106 regulates flow from the vent to atmosphere. The top surface of vent 100 is a distance DT from the soil surface; and, the bottom surface is a distance DB from the top of the conduit.

Preferably, vent 100 is spaced apart from the top of the conduit by an approximately constant thickness layer of soil—within a few inches or so, in a typical installation. That will help to make the air flow through the soil from the conduit to the vent even along the length of the horizontally extending conduit, subject to major local variances in soil permeability.

Preferably, vent 100 is a perforated pipe, such as familiar corrugated single wall slotted polyethylene drainage pipe having a filter sleeve (i.e., with a geotextile or filter fabric wrapping), such as provided by Hancor, Inc., Findlay, Ohio, U.S., with 3 or 4 inch diameter. Alternately, vent 100 may be a 1 to 4 inch diameter Schedule 40 PVC Flush Thread Screen (Monoflex North, Bechtelsville, Pa., U.S. The Monoflex product is a pipe which has closely spaced apart thin slots, of from 0.010 to 0.125 inch width, preferably 0.010–0.020 inch width, running one-half or one-third of the way around the circumference. In a typical installation, the conduit might be 36 inch wide by 12 inch deep, pipe 32 will be 4 inch in diameter, vent pipe 100 will be 2 or more inch diameter, DT and DB will be at least 6 inch. A vent pipe line may be installed during the time in which a trench is being backfilled during original installation of a leaching conduit. Alternately, for a previously installed and backfilled conduit, a narrow shallow trench may be excavated, the pipe installed, and the small trench backfilled.

The fraction of air which flows to atmosphere through the vent 100 at the riser, as a function of all the air flowing from the conduit into the soil, will depend on the dimensions DT and DB, what the permeability of the soil is, and the extent to which the vent is throttled by valve 106. Experiments in sandy loam characteristic of many leaching systems indicate that 90 percent and more of the air flow can be through an unthrottled vent, when the installation is like that illustrated by FIG. 1. The dramatic effect of a vent may sometimes be seen visually. For instance, when rain causes film of water to overlay the soil surface, closing of the throttle valve will cause visible air bubbles in the surface, which are not present when the vent is unthrottled.

In the invention, the volume of airflow is small compared to the cross section area of the flow path within a vent, even when the vent comprises permeable media. Thus, Reynolds Numbers can be surmised as low. Thus, pressure drop along the airflow path within a vent can be expected to be low. As a result, air flowing through the soil will "see" essentially atmospheric pressure as it approaches the vent. When the vent does not have a riser, i.e., when it is not connected to atmosphere either by design or by a closed throttle, then the air may still flow vertically through the vent, re-entering soil above the vent. In that instance, there will be a reduction in total flow path resistance, compared to no vent. In all instances, some air can flow through the soil which is around and away from the vent.

When there is flow through the vent, subsoil airflow patterns and related isobars within the soil around the conduit are changed from those which characterize no-vent or a vent having its valve closed. Assuming homogenous permeable soil and a constant pressure of air to the conduit interior, when air flows through an atmosphere-connected vent, there will be increased flow out the conduit top (assuming a permeable top), and increased flow out the sidewalls, particularly the upper portions, along with some flow increase through the conduit bottom. (Exactly how air will flow in real soil is difficult to forecast, given the effect of variables such as in inhomogeneity, water content and organic matter, and anomalies such as root paths and worm, rodent and insect tunnels.) Also, since the vent provides an easier and alternate path to atmosphere, for any given air pressure applied to leaching pipe 32, the amount of flow through the leach field will be greater than in absence of the vent, for a given pressure. Thus, if desired, lower pressures may be used to accomplish a given airflow through the leaching system, with resultant energy saving. Control of flow through the vent by throttling valve means is a tool for manipulating the airflow distribution, and varying the flow and effect of air within the soil of the leach field.

More than one riser, like riser 104 with optional valve 106, may be used along the length of any vent. Conversely, multiple parallel strings of leaching conduit may have associated vent lines, which lines may have a common riser or separate risers. A vent is permeable, which means it can receive or discharge air to the soil. A riser is a structure which carries vent air to atmosphere. Thus, a riser need not be permeable. It can be other than a pipe and need not be vertical. Valve means comprehends devices, other than conventional gate or seat type valves, which achieve the same purpose. For instance, different orifice plates or other flow impeders and back pressure creators may be used. Air flowing from the discharge end of the vent may be passed through a filter, provided the back pressure of such does not adversely affect the aim of having the vent.

Figure 3:
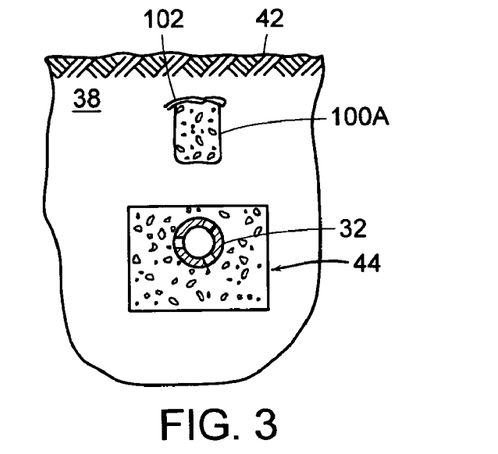
FIG. 3 is like FIG. 1, showing a vent line which comprises a small trench filled with stone.
Figure 7:
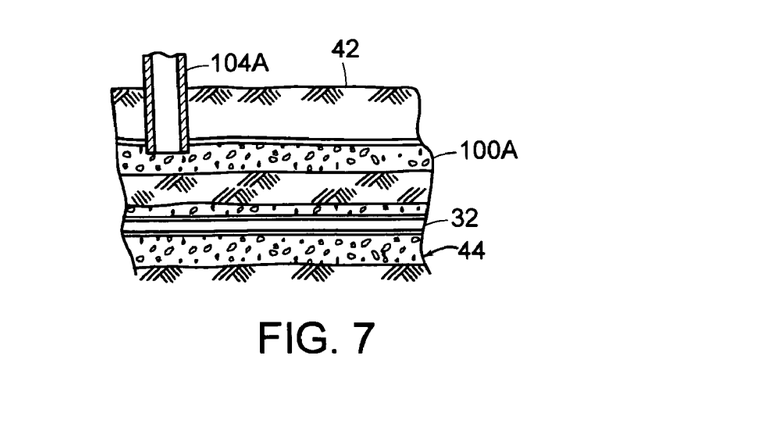
FIG. 7 shows how the vent of a stone filled trench in FIG. 3 may be connected to atmosphere.

FIG. 3 shows, in vertical cross section, alternate embodiment vent 100A which comprises a stone filled region running with in the soil above and along the length of conduit 44. Vent 100A may be formed by excavating a trench above the conduit, partially filling it with particulate media, for instance natural rock material, such as half-inch crushed stone, pea stone, or coarse sand; then covering the media with a membrane or a geotextile layer 102 to prevent soil intrusion into the media; and, then backfilling the remainder of the trench. In a variation not shown, a perforated pipe may run within the stone of the vent 100A. In this example, at least one riser 104A connects vent 100A to atmosphere, as shown in FIG. 7. Optionally, if throttling is required, vent 100A, or any other vent can run to the edge of a slope. For example, vent 100 in FIG. 2 could be extended to sloped soil surface 105, instead of running to riser 104.

Figure 9:
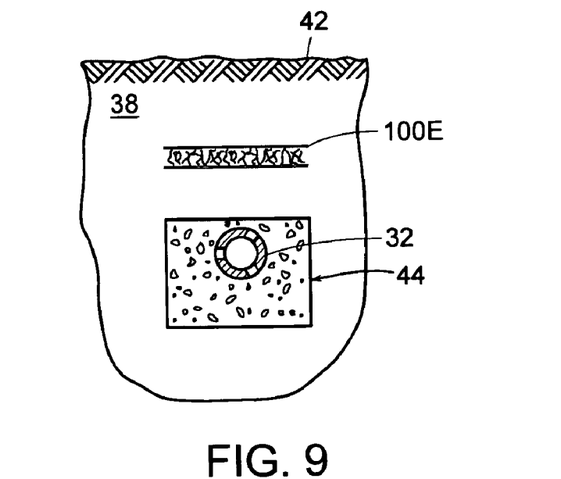
FIG. 9 is a cross section like FIG. 1, showing an EnkaDrain proprietary product used as a vent.

FIG. 9 shows another embodiment, wherein vent 100C comprises a mat of very permeable material which is resistant to compression by the weight of overlying soil. For example, vent 100C may be an Enkadrain drainage system (Akzo Nobel Geosynthetics, Arnhem, Netherlands), which product comprises of an irregularly coiled stringy plastic sandwich material running between two spaced apart layers of geotextile.

Figure 10:
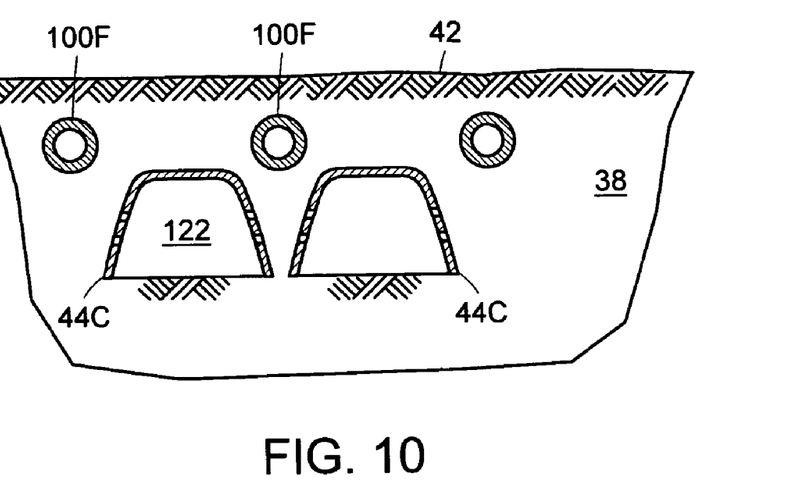
FIG. 10 is a vertical cross section like FIG. 1, showing two abutting leaching chambers with three vent pipelines.

While lengthwise running vents are preferably approximately centered on and directly above horizontal conduits, vent(s) may be offset from the conduit in the generality of the invention. For example, an offset single vent might be desirable when the terrain slopes greatly transversely to the length of a conduit. As another example, FIG. 10 shows two side by side arch shape cross section plastic leaching chambers having hollow interiors 122 and three associated perforated pipe vent lines 100F, each offset from the vertical centerline of the chambers. The bottom surface of each vent 100F is at a higher elevation than the top surface of an associated chamber. In alternate embodiments, the vent is spaced apart horizontally from the conduit. While generally rectangular cross section vents with height greater than width are shown, other aspect ratios and cross section shapes may be used, including shapes which run at an angle to vertical or horizontal.

Figure 4:
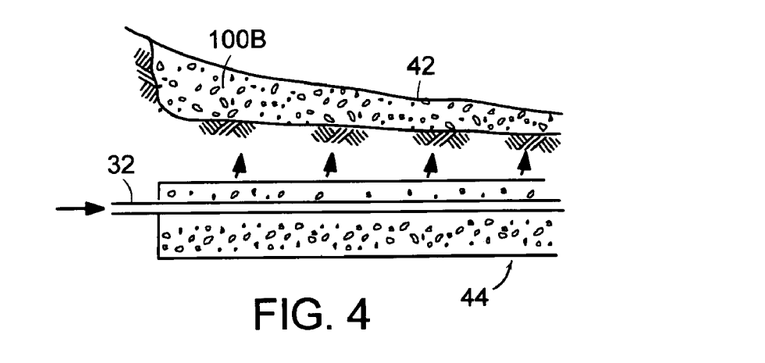
FIG. 4 is a vertical cross section through soil along the length of a leach field conduit like that shown in FIG. 1, wherein a balancing vent comprising a stone filled trench extends to the soil surface.

FIG. 4 shows another embodiment of the invention. Vent 100B is a slot-trench running along the length of the conduit, for instance a 3 inch wide trench. The trench vent 100B is preferably comprised of particulate media which may be crushed stone, pea stone, or coarse sand, such as Filpro No. 4 sand (U.S. Silica Co., Berkley, W. Va.), which extends upwardly to the surface 43. Other permeable media such as fibrous matting and the Enkadrain product may be used in substitution of particulate media in this and other embodiments. The bottom of the trench 100B runs substantially parallel to the top of conduit 44. Since the media in vent 100B has low resistance to flow, compared to soil, and since the air flow per unit area of media is of low velocity, the greater depth of media in the deep part of vent-trench 100B does not adversely affect the efficacy of the vent in providing a system wherein there is a soil path from the conduit to atmosphere, having substantially uniform flow resistance, at points along the length of the conduit. Optionally, a thin layer of soil may overlie the top of the vent, for decorative landscape or other like purpose.

Figure 11:
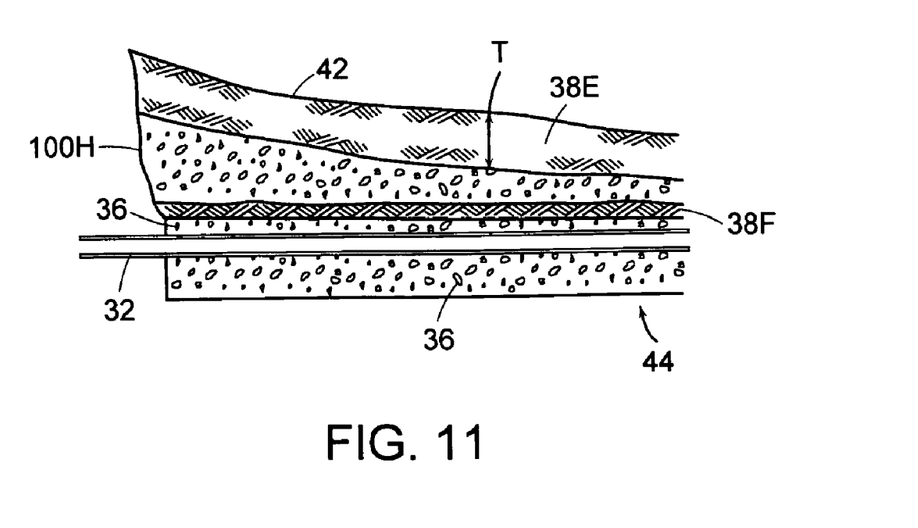
FIG. 11 is like FIG. 4, showing a vent overlaid by a constant thickness of soil.

FIG. 11 shows another embodiment, having elements in common with the foregoing embodiments. Uneven air flow which would otherwise result from the sloping terrain is compensated for by media filled vent 100H, the bottom of which lies on top of conduit 44. The thickness T of soil 38E which overlies the vent is approximately constant. The nominally constant thickness of layer of soil 38F, which is between the conduit surface and the bottom of the vent, may be eliminated, in an alternate embodiment, whereupon the vent would for practical purpose become an upward extension of a stone filled trench. However, that alternative is much less desirable with respect to flow through conduit sidewalls and bottom, or with respect to an aim of controlling flow distribution in the soil by means of a control valve on the vent.

Figure 5:
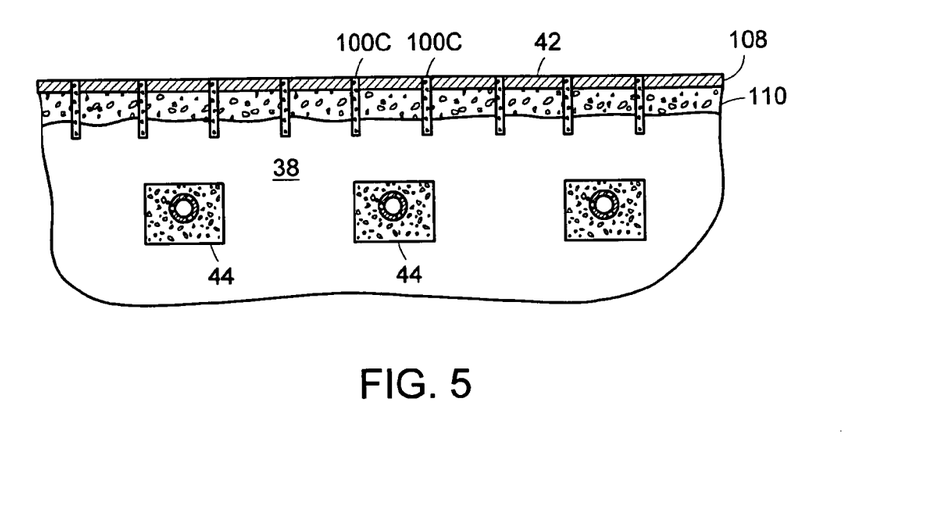
FIG. 5 is a cross section through the length of three parallel leaching conduits buried beneath soil having a paved surface for motor vehicles. Slot trenches form vents running parallel to the conduit.

FIG. 5 shows in vertical end view cross section of three parallel stone filled conduits 44. At the surface of soil 38, a bituminous pavement layer 108 overlies a gravel and stone base 110, to provide a paved surface 42P on which motor vehicles may be parked in all kinds of weather. In the invention, a multiplicity of slots are cut into the pavement, so they extend downwardly to a desired elevation above the conduits. The slot trenches are filled with the kinds of particulate media described above, to form a multiplicity of vents 100C. Preferably, the slot trenches will be narrow, to minimize the disruption of the pavement, and will be filled with sand, and they will be of generally even depth. Vents 100C may run parallel or non-parallel to the conduits. Particularly if the leaching system comprises a bed, e.g., cross connected chambers embedded in a continuous layer sand or gravel, slot trenches 100C may be preferably run in a rectangular grid pattern. A plurality of holes may be substituted for slots in this embodiment. See the description for FIG. 6, below.

Figure 12:
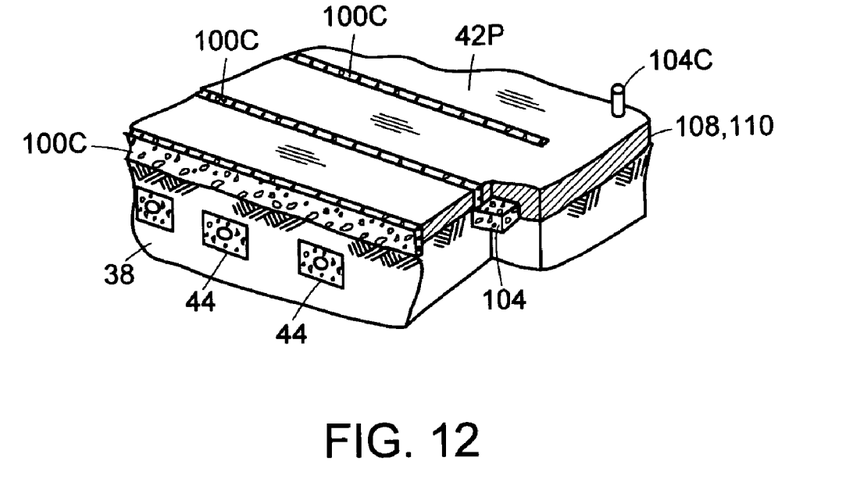
FIG. 12 is a perspective view of the vent system illustrated in FIG. 5, with the addition of a header to collect air from the slot trench vents.

FIG. 12 shows a perspective cutaway view of a modification of the apparatus in FIG. 5. Slot trench vents 100C run to also vent header 124, which collects the air flowing through the soil into the slot trenches. Header 124 may be constructed in various ways and may intersect other than the ends of slot trenches. Preferably it is a stone filled trench, with or without a perforated pipeline, which runs to throttled riser 104C, in accord with the other embodiments herein. The tops of the slot trench vents 100C may be filled with fine compacted sand or bituminous material. This embodiment of the invention is attractive when the leaching system is being retrofitted with an aeration system previously covered by pavement. It will be useful for situations where other kinds of material layers are at the top of the soil profile, where the layer is hard and of low permeability, compared to the average of the rest of the soil overlying the conduit. For instance, the surface may comprise stone slabs, concrete, plastics, composite organic materials and highly compacted water shedding soil.

Figure 6:
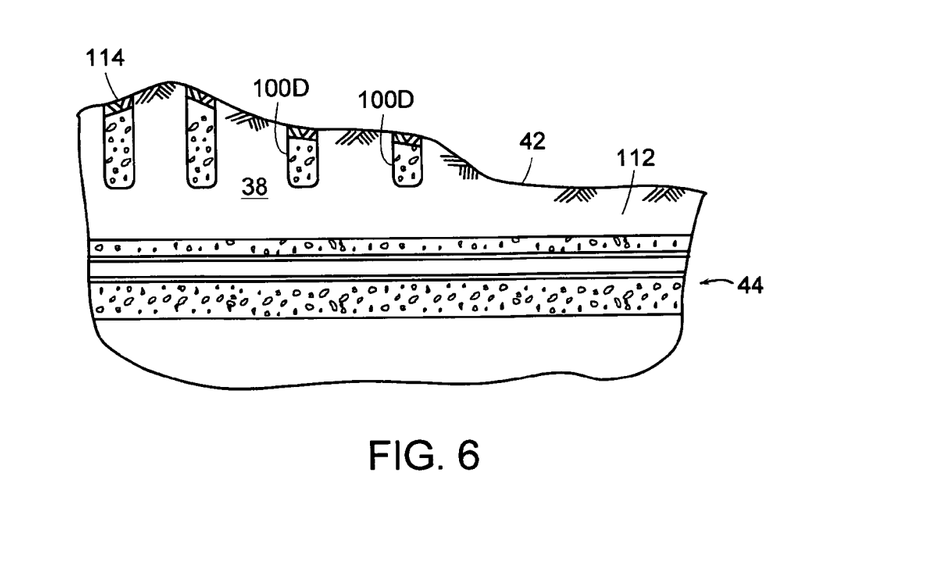
FIG. 6 is a cross section like FIG. 4, showing spaced apart cylindrical holes filled with stone, to form a vent where the soil layer about the conduit is thick.

FIG. 6 is a lengthwise cross section of a conduit in soil, like FIG. 4. It shows how vent 100D comprises a plurality of cylindrical bore holes filled with stone or other particulate or fibrous media, closely spaced apart along the length of the conduit. The filled holes may preferably be topped with a thin layer of geotextile (not shown) and then with soil 114, for cosmetic soil surface appearance reasons. As the Figure suggests, the holes (or other kind of vent within the scope of invention) may be placed only in the region of the conduit length where the layer of soil 38 is thick or less permeable, to relatively increase flow in such region, compared to another region along the conduit length, where the soil layer is thin and there are no vents, e.g., region 112 in FIG. 6.

Figure 8:
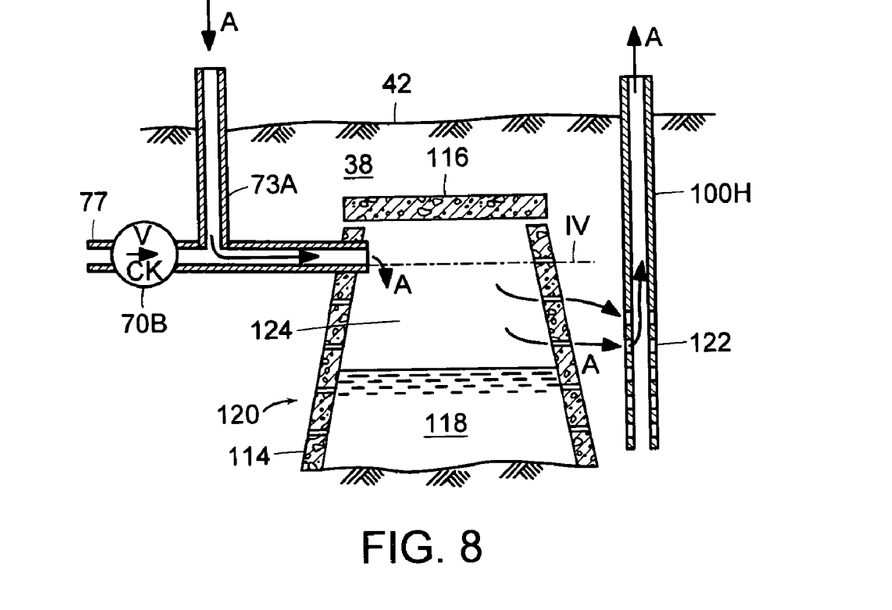
FIG. 8 is a vertical cross section through a leach pit and one of a multiplicity of adjacent vertical extending vents with perforated bottom ends.

FIG. 8 is a cross section through a leaching conduit which is leach pit 120, having a circumferential sidewall comprised of blocks, stones, bricks, pre-cast concrete or other elements, which provide a wall with openings for water flow to the surrounding soil, and a lid 116. Alternately, the pit may be made of pre-cast concrete. When in use, the pit contains some wastewater 118. In fashion analogous to that described for FIG. 1, wastewater flows to the pit through line 77, which has check valve 70B. Air or other active gas flows, as indicated by arrows A, down feed line 73A from an unshown gas pressure source, through line 77, and into the pit interior 124. In the invention, there is at least one, preferably a multiplicity of circumferentially spaced apart vertically extending vent pipes 100B adjacent the influence zone, that is, spaced apart laterally from the pit. Vent 100B has perforations only at its lower end 122, so that the lowered resistance path for air thereby created is one which causes the air to flow generally sideways and preferably downwardly. The perforations in the vent pipe 100H are present only a locations which are below elevation IV of the invert of the wastewater inflow pipe 77. Other ways of obtaining the preferred vent inflow localization may be used, including installing barriers of membrane or low permeability material within the soil near the vent pipe or other substitutional vent construction. As with the other embodiments, a throttle may optionally be placed on the exit end of vent 100H.

Figure 13:
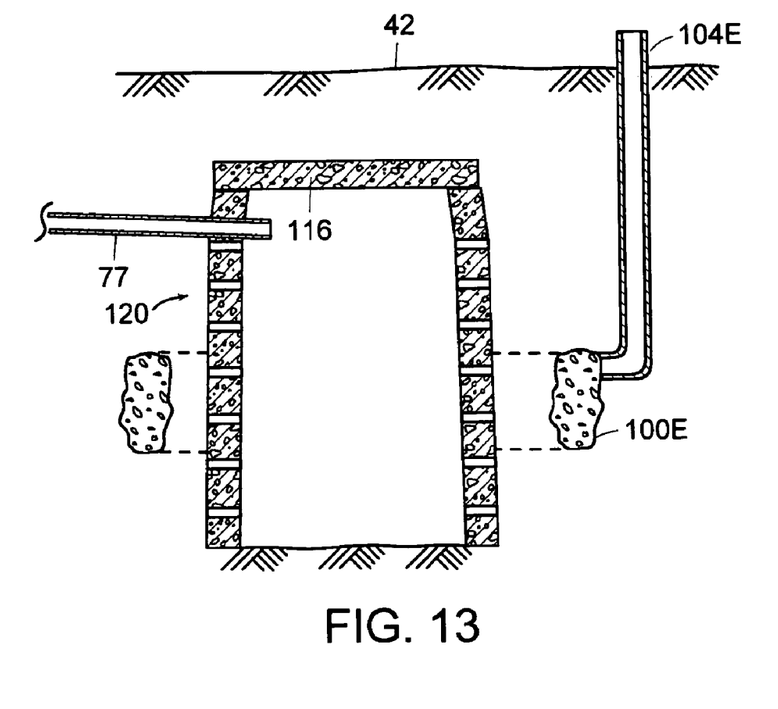
FIG. 13 is like FIG. 8, showing a donut shape vent which surrounds the leach pit.

FIG. 13 shows another embodiment of the invention applied to a leach pit 120 like that shown in FIG. 8. Vent 100E is a circular stone filled trench buried in the soil. It is donut-shape. Riser 104E conveys air from the vent to atmosphere. Optionally, there is no riser, and the region of increased permeability changes and enhances the airflow through the soil, as described in connection with FIG. 1. In still another embodiment, not shown, the vent is a disk shaped stone filled region in the soil, centered over the top of a leach pit, that is buried deeper than FIGS. 8 and 13 suggest. In all embodiments, further vents, laterally spaced apart from the centerline of the leach pit may be added. Here, as for other embodiments of the invention, the use of stone filled trench as vent is intended is intended as exemplary and not limiting. A cesspool may be vented similarly to a leach pit.

Figure 14:
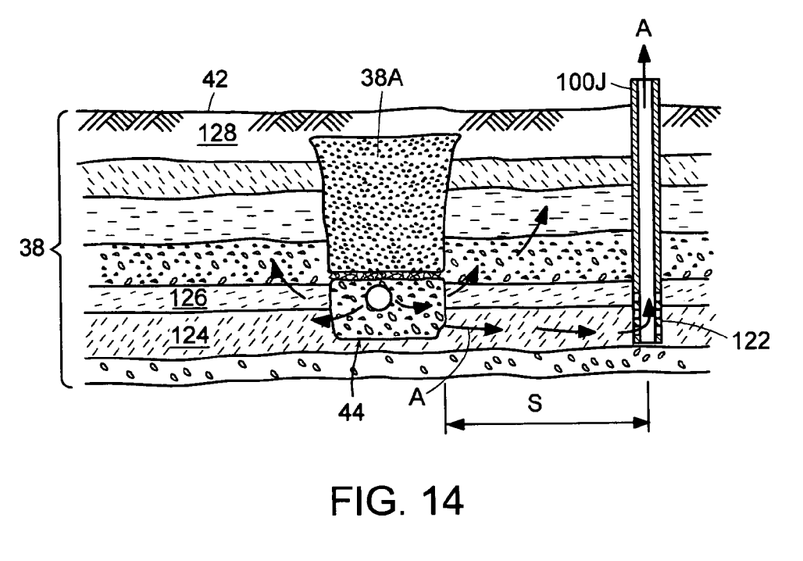
FIG. 14 shows in vertical cross section a conduit buried in a stratified soil profile, where the vertical vent causes preferential flow in a particular stratum.

FIG. 14 shows a simple example of another embodiment of the invention, which can be applied to conduits which are leach pits/cesspools or leach trenches, one of which is shown. Conduit 44 is buried within a stratified soil profile 38, which may be inclined rather than horizontal, as shown. Top soil 128 covers disturbed soil 38A which lies over the geotextile-covered stone of the conduit. In the example, layer or stratum 126 has low permeability to wastewater and air flow, compared other strata, in particular stratum 124 just below. Based on soil-exploration boring and determination of the layers and their characters, the perforated lower end 122 of vertical vent pipe 100J has been positioned preferentially in more permeable stratum 124, at a location which is laterally spaced apart from the edge of the conduit by a distance S which is at least one, and preferably 2 to 3 times, the nominal width of the trench. Thus, air A will flow preferentially along the stratum 124, which will preferentially enhance the ability of that stratum to treat wastewater. Thus, the influence zone has been extended laterally in horizontally permeable stratum. Of course, the water is expected to percolate downwardly, into the strata below stratum 124, toward the water table, as it flows laterally to and beyond the location of vent 100J. The more permeable stratum may not intercept the vertical sidewall of the conduit, but may be above or below it. More than one spaced apart, permeable stratum vent may be used. A multiplicity of vents may be placed around the periphery of a vertical leaching conduit. One of the several variations of horizontal running vents may substitute for the vertical vent with perforated lower end.

It is not desirable that a vent run vertically from the top of the conduit to the soil surface, because the air would not be passing through any soil where microbiological treatment takes place. Typically, a layer of soil is between the conduit top or side and the vent. Alternately, the layer of soil is between the top of the vent and the soil surface, as when the vent does not have a riser. Preferably, as mostly shown, there is a layer of soil at both places; and the total thickness of the one or more layers is at least 6 inch. Experience shows having the layer is a desirable and effective way of preventing potentially offensive odors from being carried to the environment above the surface of the soil.

While common crushed stone or coarse sand is preferred for availability and cost, other particulate media may be used in the practice of the invention, including but not limited to expanded polystyrene beads, plastic particles or objects. Within the generality of the invention, permeable media other than particulate, including fibrous blanket material such as fiberglass, and proprietary drainage products including but not limited to said EnkaDrain drainage system.

The invention may be used for new and pre-existing leach field installations, where other requirements necessitate that the elevation of soil vary along the length of conduits, or where control or assurance of air flow is sought. It is effective for systems previously installed in soil of varying elevation, for which it is desired to apply aeration in accord with the patent, since the established soil surface contour need not be changed. And it may be used where the soil layer is of even thickness but of low permeability to air, to improve the functioning of the system, or to avoid localized bubbling during rain storms, as for instance is accomplished by suitable slot trench vents in certain paved surfaces.

While the invention has thus far been described in terms of a conduit which is pressurized, the principles of the invention can be used when the conduit is susceptible to being partially evacuated by pumping, as described in U.S. Pat. No. 6,485,647. As an example, when air is drawn downwardly from the atmosphere through the soil surface, and the soil thickness over the conduit is uneven along the length of the conduit, the amount of air drawn through the influence zone will vary along the length. A vent, such as the stone filled trenches of regions shown in FIGS. 4, 6 and 11, will be as helpful as it is in when the conduit is pressurized.

By this analogy it will be appreciated how the other embodiments may also be used with lower than atmosphere pressure in the conduit.

Although this invention has been shown and described with respect to one or more preferred embodiments, and by examples, those should not be considered as limiting the claims, since it will be understood by those skilled in the art that various changes in form and detail thereof may be made, and that equivalents thereof may be made, without departing from the spirit and scope of the claimed invention.

I claim:

1. A leaching system, beneath the surface of soil, for treating wastewater, which comprises:
   a leaching conduit, having a wastewater treatment influence zone adjacent thereto;
   means for pressurizing the conduit with air;
   wherein said air flows from the conduit, through the influence zone, and then to atmosphere above the soil surface; and,
   a vent, having artificially increased permeability compared to the permeability of the surrounding soil, within soil proximate the conduit, for receiving and carrying a portion of said air toward the soil surface.

2. The leaching system of claim 1 wherein the vent is spaced apart from the leaching conduit by a layer of soil.

3. The system of claim 2, further comprising: a riser connected to said vent, for carrying air from the vent to atmosphere.

4. The system of claim 3, further comprising: means for controlling the flow of air in the riser, for changing the amount of air flow within the vent.

5. The system of claim 1 wherein the vent comprises permeable media running to the surface of the soil.

6. The system of claim 1 wherein the leaching conduit and vent run horizontally within soil.

7. The system of claim 6, wherein the soil overlying the conduit has permeability which varies along the length of the conduit.

8. The system of claim 6 wherein the vent is offset from the soil which lies vertically above the conduit.

9. The system of claim 6 wherein the vent is vertically above the conduit and spaced apart from the conduit by an approximately constant thickness layer of soil.

10. The system of claim 6, wherein the surface of the soil varies in elevation relative to the top of the conduit, wherein the vent is vertically above the conduit, and has a height which varies along the length of the conduit, so that the total thickness of soil above the length of conduit is approximately uniform.

11. The system of claim 1 wherein the bottom of the vent is at an elevation higher than the top of the conduit, to receive a portion of said air which is flowing through the soil.

12. The system of claim 1 wherein the vent is a perforated pipe.

13. The system of claim 1 wherein the vent comprises a multiplicity of spaced apart vertical holes filled with permeable media.

14. The system of claim 1 wherein the vent comprises a plurality of spaced apart slot trenches running to the surface.

15. The system of claim 14 wherein a layer of hard, low permeability material lies on the surface of the soil.

16. The system of claim 14 further comprising a header which interconnects said trenches, to receive air flowing lengthwise through the slot trenches.

17. The system of claim 12 wherein the vent comprises a vertical pipe having a perforated bottom, for inflow of said air portion.

18. The system of claim 1 wherein the leaching conduit runs vertically and has a circumscribing sidewall and top; and, wherein wastewater flows to said conduit by means on an inflow pipe having an invert elevation.

19. The system of claim 18, wherein substantially all of the air portion which is received by the vent enters the vent at an elevation lower than said invert level.

20. The system of claim 19 wherein said vent is donut shape and spaced apart from said sidewall.

21. The system of claim 1 wherein the soil profile laterally adjacent the conduit comprises strata, wherein at least one lower permeability stratum overlies a high permeability stratum of soil;
    wherein the vent permeability is greater than the permeability of said high permeability stratum; and,
    wherein a portion of the vent is within the high permeability stratum, to receive air flowing laterally from the conduit through said stratum.

22. In the method of flowing pressurized air into a leaching conduit of leaching system, to affect the biological and chemical processing of wastewater therein, so the air flows through the soil around the conduit and then to atmosphere above the soil surface, the improvement which comprises:
    providing a vent path running toward atmosphere within the soil, which path has higher permeability than the surrounding soil; wherein the pressure of air within the vent is equal or greater than the pressure of atmosphere above the soil surface.

23. The method of claim 22 which further comprises:
    controlling the amount of air which flows along said path by connecting said vent to a riser;
    and, throttling the flow out the riser, so the pressure in the vent is greater than atmospheric pressure.

24. The method of claim 22 wherein the conduit and vent run horizontally in the soil, further comprising: spacing the vent apart from the conduit a constant distance, along the length of the vent.

25. A leaching system, beneath the surface of soil, for treating wastewater, which comprises:
    a leaching conduit, having a wastewater treatment influence zone adjacent thereto;
    means for reducing the pressure in the conduit below atmospheric pressure, to cause air to flow through the influence zone and into the conduit, and then to atmosphere above the soil surface; and,
    a vent, having artificially increased permeability compared to the permeability of the surrounding soil, within soil proximate the conduit, for carrying a portion of said air from atmosphere above the soil and then through the influence zone and to the conduit, wherein the pressure in the vent is equal or less than atmospheric pressure.

26. The leaching system of claim 24 wherein the vent is spaced apart from the leaching conduit by a layer of soil.

27. The system of claim 26, further comprising: a riser connected to said vent, for carrying air from atmosphere to the vent.

28. The system of claim 27, further comprising: means for throttling the flow of air into the riser.

29. The system of claim 25 wherein the vent comprises permeable media running to the surface of the soil.

30. The system of claim 25 wherein the leaching conduit and vent run horizontally within soil.

31. The system of claim 30, wherein the soil overlying the conduit has permeability which varies along the length of the conduit.

32. The system of claim 30 wherein the vent is offset from the soil which lies vertically above the conduit.

33. The system of claim 30 wherein the vent is vertically above the conduit and spaced apart from the conduit by an approximately constant thickness layer of soil.

34. The system of claim 30, wherein the surface of the soil varies in elevation relative to the top of the conduit, wherein the vent is vertically above the conduit, and has a height which varies along the length of the conduit, so that the total thickness of soil above the length of conduit is approximately uniform.

35. The system of claim 25 wherein the vent is a perforated pipe.

36. The system of claim 35 wherein the vent comprises a plurality of spaced apart slot trenches running to the surface.

37. The system of claim 35 wherein the vent comprises a vertical pipe having a perforated bottom, for flow of said air portion.

38. The system of claim 25 wherein the leaching conduit runs vertically and has a circumscribing sidewall and top; and, wherein wastewater flows to said conduit by means on an inflow pipe having an invert elevation.

39. The system of claim 26 wherein the soil profile laterally adjacent the conduit comprises strata, wherein at least one lower permeability stratum overlies a high permeability stratum of soil;

wherein the vent permeability is greater than the permeability of said high permeability stratum; and, wherein a portion of the vent is within the high permeability stratum, to receive air flowing laterally from the conduit through said stratum.

* * * * *